United States Patent
Delmoro et al.

(10) Patent No.: US 6,763,706 B1
(45) Date of Patent: Jul. 20, 2004

(54) LOAD CELL CONICITY CALIBRATION APPARATUS AND METHOD

(75) Inventors: Richard L. Delmoro, Tallmadge, OH (US); David P. Krause, Hartville, OH (US)

(73) Assignee: Akron Special Machinery, Inc., Akron, OH (US)

( * ) Notice: Subject to any disclaimer, the term of this patent is extended or adjusted under 35 U.S.C. 154(b) by 12 days.

(21) Appl. No.: 10/364,698

(22) Filed: Feb. 12, 2003

(51) Int. Cl.[7] .............................................. G01B 13/00
(52) U.S. Cl. ........................ 73/115; 73/146.2; 73/146.3
(58) Field of Search ................................ 73/1.08, 1.15, 73/862, 862.15, 862.381, 862.451, 862.51, 865.55

(56) References Cited

U.S. PATENT DOCUMENTS

| | | | | |
|---|---|---|---|---|
| 3,698,233 A | * | 10/1972 | Braden et al. ................. | 73/146 |
| 4,366,707 A | * | 1/1983 | Jarschel ........................ | 73/146 |
| 4,663,889 A | * | 5/1987 | Strand et al. .................. | 451/5 |
| 4,704,900 A | * | 11/1987 | Beebe ........................... | 73/146 |
| 4,936,054 A | * | 6/1990 | Rogers et al. ................. | 451/51 |
| 5,291,776 A | * | 3/1994 | Mallison ....................... | 73/146 |
| 5,317,912 A | * | 6/1994 | Mallison ....................... | 73/146 |
| 5,323,646 A | * | 6/1994 | Poling, Sr. .................... | 73/146 |
| 5,448,910 A | * | 9/1995 | Yurjevich et al. ............. | 73/146 |
| 5,719,331 A | * | 2/1998 | Delmoro ....................... | 73/146 |
| 5,777,219 A | * | 7/1998 | Popio et al. ................... | 73/146 |
| 6,214,280 B1 | * | 4/2001 | Delmoro ....................... | 264/502 |

* cited by examiner

Primary Examiner—Hezron Williams
Assistant Examiner—Rogers A David
(74) Attorney, Agent, or Firm—Renner, Kenner, Greive, Bobak, Taylor & Weber

(57) ABSTRACT

A calibration fixture for calibrating load cells in a tire uniformity machine, the tire uniformity machine having a carriage rotatably supporting a load wheel on a first spindle and a second spindle, a first load cell and second load cell in sensing relation to the load wheel and attached to the carriage, at least one of the load cells having a support portion and a sensing portion rotatable within the support portion the calibration fixture including: a fixture member releasably attached to the cover of the load cell; and an adjustment assembly supported by the tire uniformity machine operable with the fixture member to cause movement of the sensing portion relative to the rim.

20 Claims, 6 Drawing Sheets

LOAD CELL CONICITY CALIBRATION APPARATUS AND METHOD

RELATED PATENT APPLICATIONS

None.

BACKGROUND OF THE INVENTION

Generally, tire uniformity machines are used to test the characteristics of tires after production. This testing includes measurement of the force and dimensional characteristics of the tire at varying loads. To accomplish load testing, the tire is brought into the tire uniformity machine, mounted on a chuck, and rotated by a drive assembly coupled to the chuck spindle while contacting a load wheel.

In a typical tire uniformity machine the load wheel is rotatably supported on a carriage that may be brought into and out of contact with the tire. In one known tire uniformity machine, the carriage has a pair of spindles rotatably supporting the load wheel with load cells corresponding to each spindle placed in sensing relation thereto. The load cells have an external rim that is attached to the carriage and a sensing portion located within the rim that is attached to the spindle. A cover is typically attached to the sensing portion and used to protect the sensitive internal components of the load cell. Forces transmitted through the spindle cause the sensing portion to emit an electrical signal, via a pickup on the load cell, to a controller or display unit. From the reading generated by the load cells and data provided by other sensors, the controller determines the tire's characteristics.

Due to the extremely sensitive nature of the load cells, when setting up the tire uniformity machine, it is important to properly calibrate these load cells with each other to obtain accurate readings. In some uniformity machines only a single load cell is readily accessible to the operator. Thus, to calibrate the load cells, the inaccessible load cell is attached to the carriage as previously described, and the accessible load cell is moved relative to the fixed inaccessible load cell to obtain calibration. To calibrate load cells, tie accessible load cell is moved such that it may be attached to the spindle. Once this load cell is properly located, the axis between the accessible and inaccessible load cells must be aligned.

Typically, alignment of the axis is not performed. Often the alignment is assumed from the orientation of the load cells. Without proper alignment of the axis, the load cells produce inaccurate readings. For example, in measuring forces at the spindle, the forces generated may be supplemented or reduced by the inaccurate readings of the load cells. While this altering of the measured force may be on the order of a tenth or single pound, the required high degree of accuracy of these machines may result in significant error.

SUMMARY OF THE INVENTION

In light of the foregoing, it is an object of the present invention to provide a method and apparatus for calibrating load cells in a tire uniformity machine.

In view of this object, the present invention, therefore, provides a calibration fixture for calibrating load cells in a tire uniformity machine, the tire uniformity machine having a carriage rotatably supporting a load wheel on a spindle, a first load cell and second load cell in sensing relation to the load wheel and attached to the carriage, at least one of the load cells having a support portion and a sensing portion rotatable within the support portion, the calibration fixture including a fixture flag releasably attached to the sensing portion of the load cell; and an adjustment assembly supported by the tire uniformity machine operable with the fixture flag to cause movement of the sensing portion relative to the support portion.

The present invention further provides a method of calibrating a load cell used to measure forces on a load wheel in a tire uniformity machine for testing a tire having a carriage rotatably supporting the load cell on a spindle supported on the carriage, wherein the load cell has a support portion surrounding a sensing portion of the load cell and a cover located within the rim and covering the sensing portion, the cover being fastened to the sensing portion by cover fasteners such that the sensing portion may be rotated by rotation of the cover, the load cell being secured to the carriage by cell fasteners located at the support portion and a center fastener passing through the cover, the method including providing a calibration fixture having a fixture flag and an adjustment assembly operable with the fixture flag to rotate the sensing portion of the load cell; aligning the load cell with the load wheel and fastening the load cell to the carriage; fastening the fixture flag to the cover; zeroing the adjustment assembly; performing a conicity test on the tire noting the conicity reading of the tire uniformity machine; and when the conicity reading is not equal to zero, loosening the cell fasteners, actuating the adjustment assembly to zero the conicity reading and subsequently tightening the cell fasteners.

Therefore, production of a load cell conicity calibration method and apparatus of the type above-described becomes the principal object of this invention with other objects, thereof becoming more apparent upon a reading of the following brief specification considered and interpreted in view of the accompanying drawings.

DETAILED DESCRIPTION OF THE INVENTION

Figure 2:
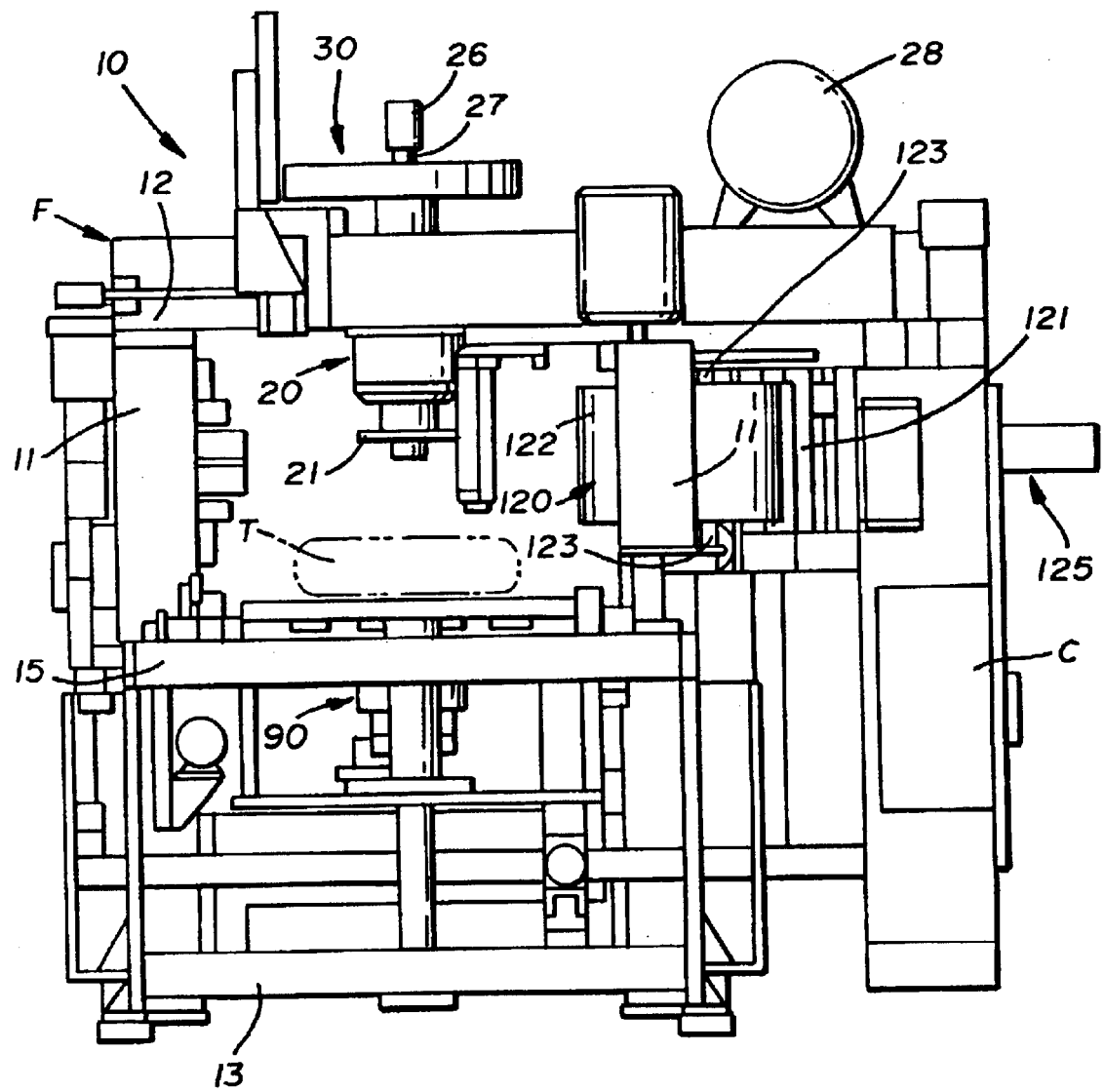
FIG. 2 is a front plan view thereof.

A tire uniformity machine, generally indicated by the numeral 10 in the figures, generally includes, as best shown in FIG. 2, vertical side frame members 11, 11 a generally horizontal top frame member 12, and a generally horizontal bottom frame members 13 to form a framework F for the machine 10, creating generally a box-like structure within which a tire T is received and tested.

Figure 1:
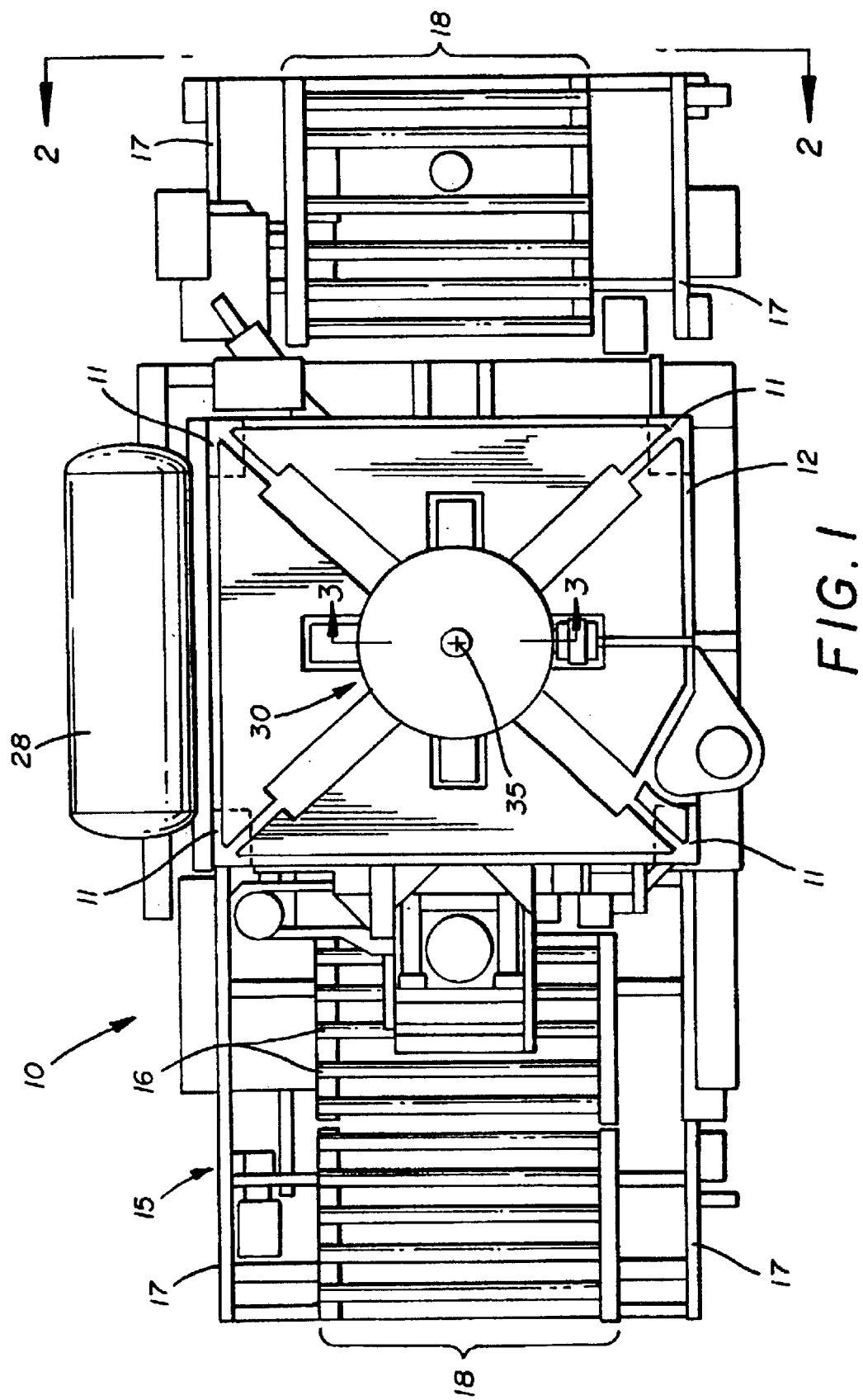
FIG. 1 is a top plan view of a tire uniformity machine according to the present invention.

As best shown in FIG. 1, tire T may be delivered into the framework F of the machine 10 and removed therefrom after testing as by a conveyer, generally indicated by the numeral 15. Conveyer 15 may include a plurality of rollers 16 rotatably supported between parallel side members 17 to form a roller bed. The side members 17, 17 of conveyer 15 and side members 11, 11 of machine 10 are generally spaced to an extent such that they are capable of receiving tires of significantly varying diameter. Once the tire T is brought within the framework F of the machine 10 from conveyor, 15, the tire T is chucked as is known in the art and prepared for testing.

Figure 3:
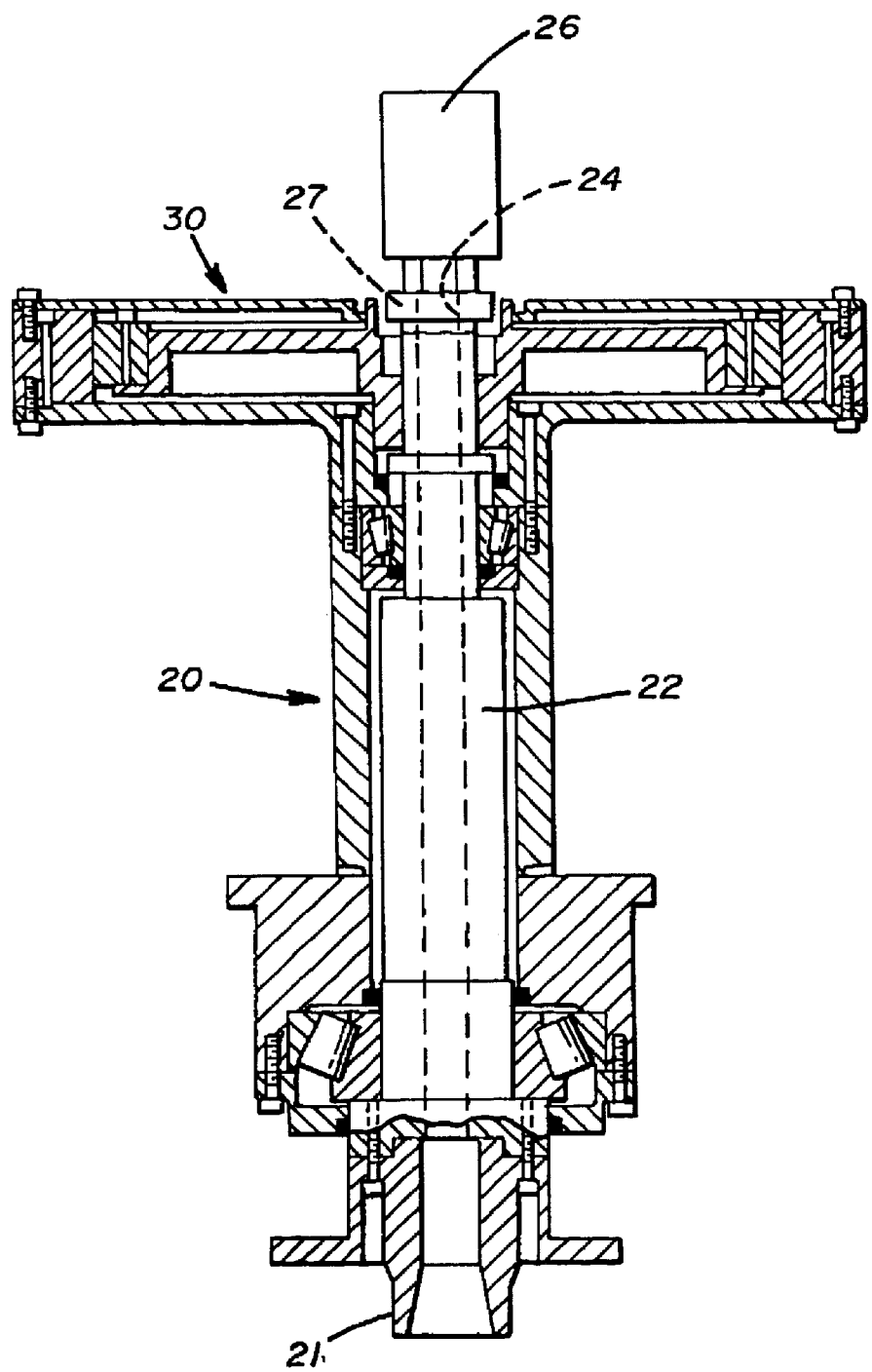
FIGS. 3–3A is a partially broken away sectional view as seen along line 3—3 in FIG. 1 depicting the direct drive motor assembly and chuck assembly in more detail.
Figure 3A:
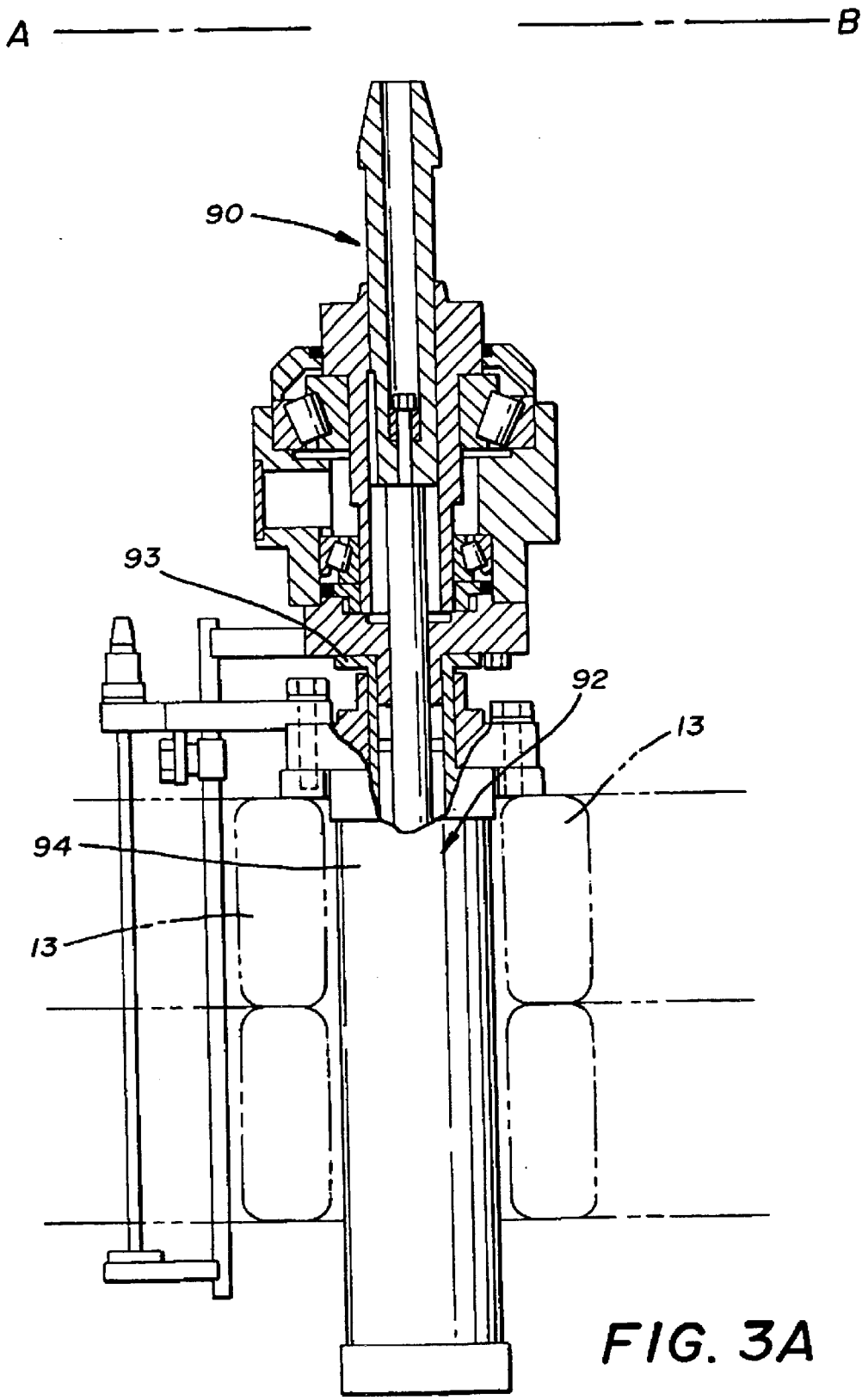

In that regard, the upper frame members 12, 12, carry an upper chuck assembly, generally referred to by the numeral 20, shown in FIG. 3A, which generally includes a chuck 21 and a spindle 22 used to rotate the upper chuck assembly 20 during the testing operation. The spindle 22 may be made hollow defining a passage 24 for transporting air to and from the tire T to maintain proper inflation thereof during testing. To that end, a union 26 may be rotatably coupled to a first end 27 of spindle 22 such that the spindle 22 may rotate within union 26 facilitating delivery of air to the tire T, from an air supply 28 (FIGS. 1 and 2), during rotation of the upper chuck assembly 20.

The upper chuck assembly 20 is directly driven by a motor assembly, generally indicated by the numeral 30, operatively coupled to the spindle 22 near the first end 27 thereof. It will be appreciated that motor assembly 30 may be coupled to spindle 22 at generally any point, and alternatively may be used to drive the lower chuck assembly 90 to the same effect.

A lower chuck assembly 90, (FIG. 3A) is shown mounted on lower frame member 13 and is supported on a shaft 91 which is attached to hydraulic unit 92. Hydraulic unit 92 conventionally includes a piston 93 and cylinder 94 operable to raise and lower the chuck assembly 90 or, in other words, move the lower chuck assembly 90 axially toward or away from the upper chuck assembly 30, such that the tire T can be chucked between the upper and lower chuck assemblies 20, 90 for testing purposes after being moved into the machine 10 along a conveyor 15.

Lower chuck assembly 90 is similar to upper chuck assembly 20 with the exception that it is not driven directly by a motor assembly 30 in the form of tire uniformity machine illustrated herein. Lower chuck assembly 90 is freely rotatable, and rotates under torque generated by motor assembly 30 acting through the upper chuck assembly 20 and the chucked tire T.

When a tire T is received within the machine 10, the lower chuck assembly 90 may be moved axially to chuck the tire between the upper and lower chuck assemblies 30, 90 in preparation for testing. It will be appreciated that when the lower chuck assembly 90 is in its retracted position, i.e., below the conveyor assembly 15, the tire may be moved into registry with the lower chuck 90 along conveyor 15. At this point, the lower chuck assembly 90 is then elevated so that the tire engages the chuck 21 of the upper chuck assembly 20 to firmly seat the tire. The tire, is then inflated to the desired inflation pressure by air directed from supply 28 through air passage 24. Once inflated, the tire is rotated and a load wheel, described below, can then be moved into engagement with the periphery of tire T to perform the testing thereon.

Thus, load wheel assembly generally indicated by the numeral 120, is provided and is carried by a carriage, generally referred to by the numeral 121, which may be mounted on the frame F. The load wheel assembly 120 includes a load wheel 122 rotatably mounted on spindles 123, 123 located on carriage 121. The spindles 123, 123 have associated with them load cells described below which are used to measure certain characteristics of the tire T, as will be explained. The carriage 121 is movable toward and away from the tire T under the power of a load wheel motor assembly, generally indicated by the numeral 125.

Figure 4:
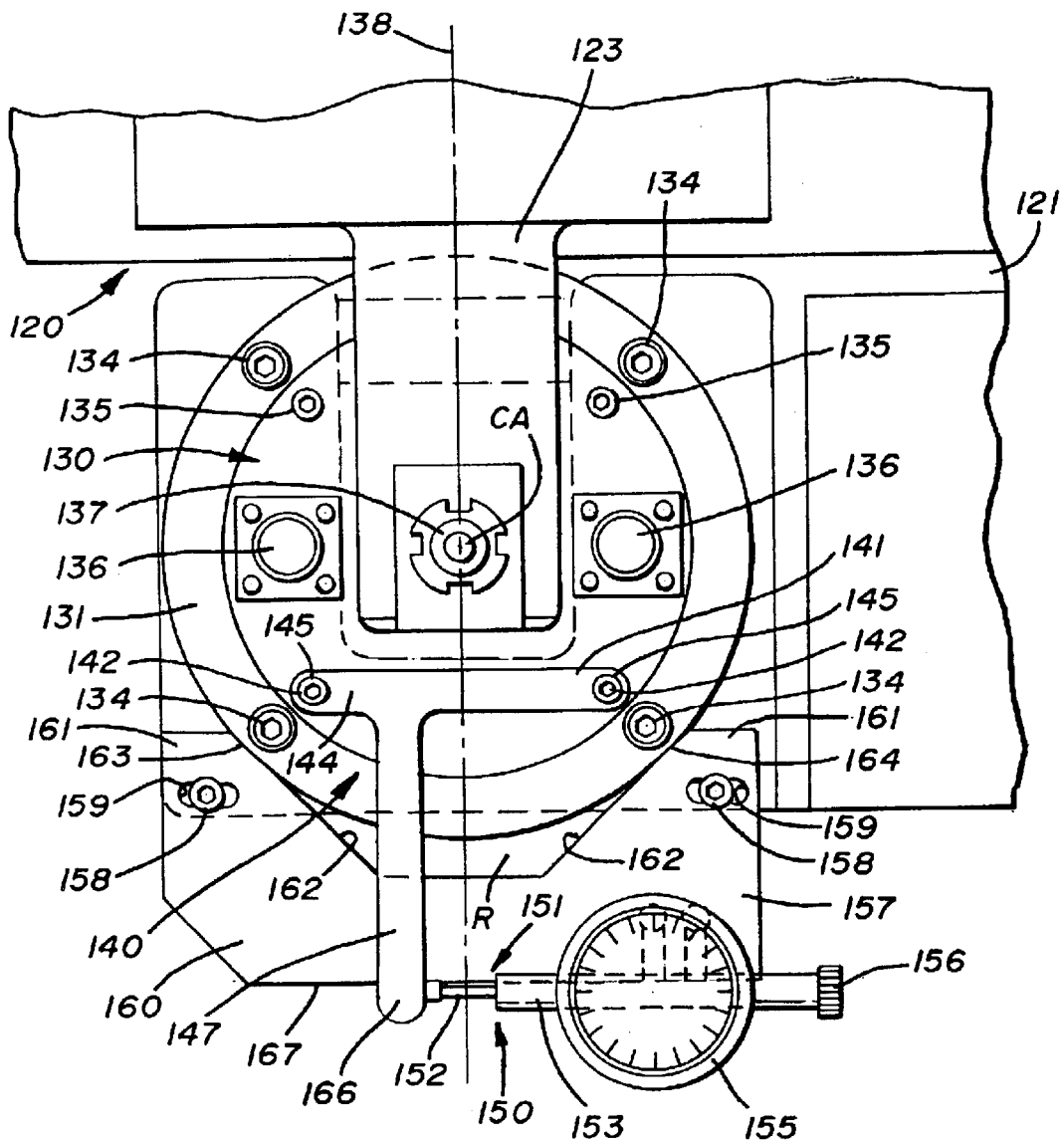
FIG. 4 is an enlarged front elevational view of a load cell mounted in a load wheel spindle in a tire uniformity machine according to the present invention depicting a load cell calibration fixture according to the present invention.

With reference to FIG. 4, one of the load cells 130, 130 associated with spindles 123, 123 is shown. In general load cell assembly 130 has a support portion and a sensing portion 133. Outer rim 131 serves to support sensing portion 133 and a cover plate 132 covering the sensing portion. Cover plate 132 and sensing portion 133 are mutually rotatable within the rim 131 to adjust the sensing element. The sensing portion and cover 132 may be attached to the spindle 123 as by a center fastener 137, which may be a bolt. Cell fasteners 134 located along the rim 131 may be used to attach the rim 131 to the carriage 121. The cover 132 is secured by cover fasteners 135, which similar to cell fasteners 134, may be spaced periodically about the perimeter of the cover plate 132. A pair of electrical pick ups 136, 136 are provided to electrically communicate signals generated during operation of the tire uniformity machine 10 to controller C.

As will be appreciated, the load cell 130 generates signals in response to very fine force transmissions communicated through the spindle 123 and is designed to be extremely sensitive. Due to its sensitivity, movement of the cell 130 or misalignment during initial set up of the machine 10 can cause significant error in the readings generated by the load cell 130. To ensure proper measurement, the load cells 130, 130 are aligned with the spindle 123 and each other such that they share a common axis 138.

To do this, one load cell 130 may be fixed and the other moved relative thereto to obtain proper alignment. In the present invention, once the load cells 130, 130 are aligned, cell fasteners 134 at the rim 131 fix the load cell 130 to the carriage 121 such that the load cell 130 is prevented from moving vertically. After the rim 131 is fixed, to align the axis of cell 130 with the axis of the other load cell, rotational adjustment of the cell 130 may be made by rotating the sensing elements housed within cover 132. To that end, a calibration fixture, generally referred to by the numeral 140 is provided to make fine rotational adjustment of the cell 130.

Figure 5:
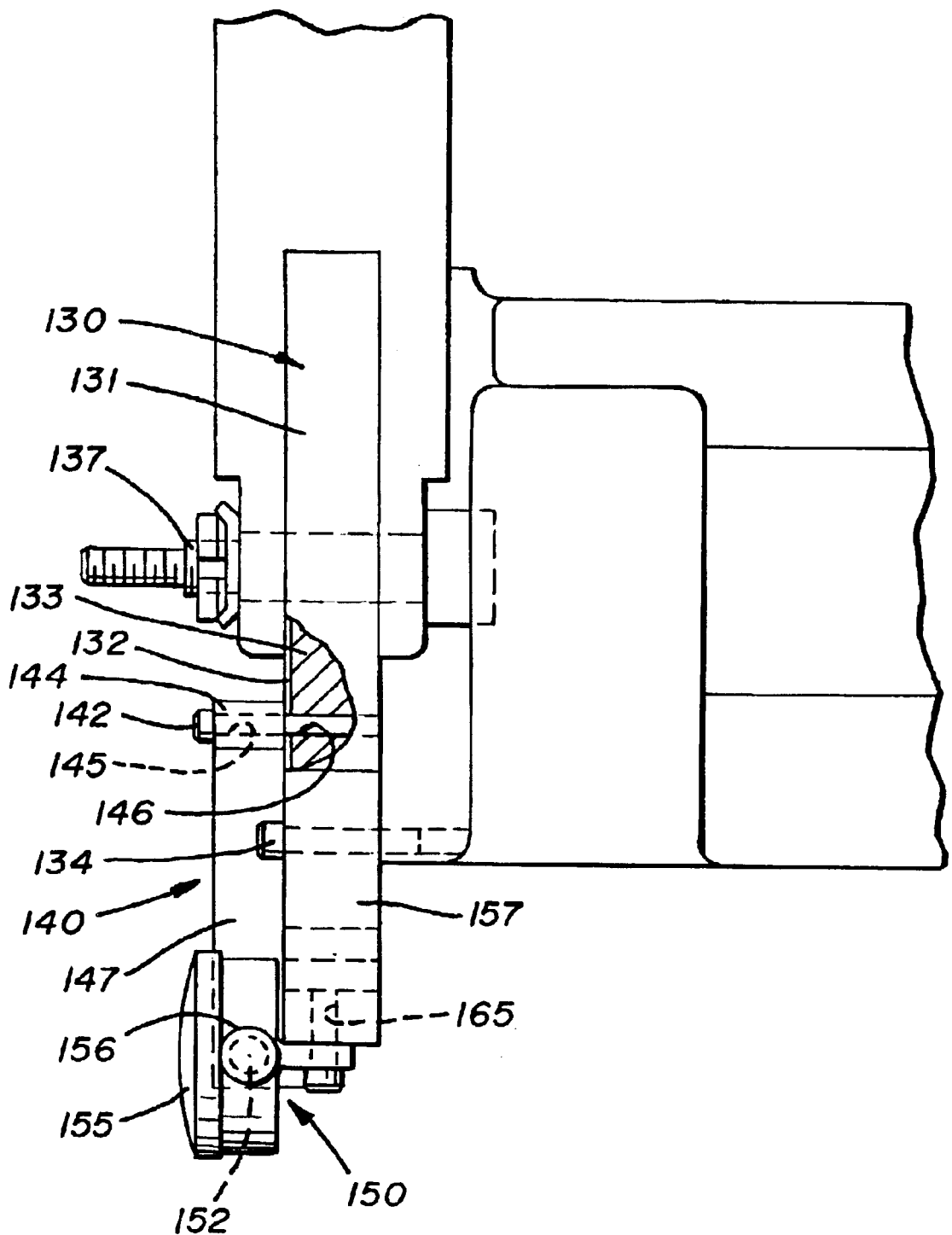
FIG. 5 is an enlarged partially cut away side elevational view of the load cell calibration fixture depicting one possible attachment of the calibration fixture to the tire uniformity machine.

The calibration fixture 140 includes a fixture member 141 attached to the cover 132 of the cell 130, as by bolts 142. Since the cover 132 is often attached by cover fasteners 135, 135 these fasteners provide convenient fastening points for the fixture member 141. As shown in FIG. 5, a first arm 144 of fixture member may be provided with receivers 145, 145 corresponding to one or more of the cover fastener receivers 146, 146. Otherwise, the fixture member 141 may be fastened to the cover plate 132 in any conventional manner.

In the embodiment shown, fixture member 141 is provided with fewer receivers 145 than the cover plate 132 such that removal of the cover fasteners 135 to attach the fixture member 141 does not require removal of the cover plate 132. For example, as shown in FIG. 4, load cell 130 may have four receivers 146 on cover 132, and, the shown fixture member 141 is be provided with two receivers 145 corresponding to one of the two pairs of receivers 146 on the cover plate 132. As further demonstrated in FIG. 4, the receivers 145 on fixture member 141 may be located such that the fixture member 141 may attach to any of the cover receivers 146 irrespective of the orientation of the cover 132. To accomplish this, the fixture member may be made nonlinear, for cover receivers 146 that are unevenly spaced, or receivers 145, such as slots, that allow repositioning of the individual fasteners may be used. When the receivers 146 on cover 132 are located at equal distances, the first arm 144 may linearly space the receivers 145 at the distance corresponding to that of the receivers 146.

To apply force to the fixture member 141 necessary to rotate the cover 132, it may be necessary to provide a projection from the first arm 144 on which force can be applied. In general, such a projection would extend radially outwardly from fixture member 141 such that force may be applied to the fixture member 141 at a distance from the center of cover 132. When the fixture member 141 includes a first arm 144 having a pair of receivers 145, 145, as shown, force may be applied on the first arm away from the center of the cover 132 to cause rotation thereof. To provide additional mechanical advantage or to move the point at which forces are applied to the fixture member 141 away from the load cell 130, a second arm 147 may extend outwardly from first arm 144 creating a lever arm on which an adjustment assembly 150 may act. As shown, second arm 147 may extend generally perpendicular to first arm 144 to define a generally L-shaped or T-shaped member on which adjustment force is applied.

To provide for adjustment, adjustment assembly 150 includes an adjustment member generally referred to by the numeral 151 in operative relation with fixture member 141 such that movement of the adjustment member 151 causes rotation of the cell cover 132. A number of commercially available adjustment assemblies 150 may be used. In the assembly shown, assembly 150 includes a threaded rod 152 acting as the adjustment member 151. The threaded rod 152 is provided with a reversible thread and is held in a receiver 153 such that rotation of the rod causes the rod to move forward or back in the axial direction. The rod 152 may be suitably coupled to or simply rest against second arm 147 such that axial movement of the rod 152 causes rotation of the fixture member and cover 132 of the load cell 130. Rod 152 may be provided with a knob 156 or other radius increasing member to facilitate fine adjustment by the user. An indicator 155 operative with adjustment member 151 may be used to measure and display the amount of adjustment being made to the load cell 130. A number of suitable indicators are commercially available including those with digital or analog displays. For example, a Starrett Dial Indicator number 25-441J may be used to give proportionate readings relating to the change in force measured by the cell. In the case of the Starrett Indicator, a 0.007 indication on the dial corresponding to one pound of force measured at the load cell 130.

The adjustment assembly 150 may be supported adjacent adjustment assembly 140 as by an indicator block 157, which has been fastened to the carriage 121, as by bolts. Indicator block 157 may be provided with receivers such as slots 159, 159 for receiving fasteners 158, 158 and allowing some adjustment of the indicator block's position relative to the load cell 130. Otherwise, fasteners 158 may be drive through indicator block 157.

Indicator block 157 includes a body portion 160 to which the indicator 155 and adjustment assembly 140 may be attached. First and second leg portions 161, 162 extend outward from body portion 160 toward load cell 130 and are spaced to receive a portion thereof. The interior surfaces of first and second legs 161, may be sloped to tangentially contact the outer surface of rim 131. In the embodiment shown, the interior surfaces 162 of legs 161 define a generally V-shaped or trapezoidal recess R that receives the lower portion of load cell 130. In use, the indicator block may be positioned such that the interior surfaces 162 of legs 161, contact the cell 130 at a first and second contact points 163, 164 and fasten to the carriage 121, as by bolts passing through slots 159, 159 to further stabilize the load cell 130. It will be appreciated that the indicator block 157 may be used solely for the purpose of stabilizing and restricting movement of load cell 130.

When the indicator block 157 is used to support the adjustment assembly 150, indicator block 157 may be provided with appropriate receivers 165, such as threaded openings, to which the adjustment assembly 150 is attached. As shown in FIG. 5, the adjustment assembly may be attached to a lower portion of indicator block 157 such that the adjustment member 151 acts at a distance from the center axis CA of the load cell 130 increasing the mechanical advantage of adjustment member 151. In the embodiment shown, the adjustment assembly 150 is attached in the lower right hand corner of the indicator block 157 with the adjustment assembly 150 and indicator 155 supported on the side of fixture member 140 away from the tire T.

In this position, adjustment member 151 acts on second arm 147 of fixture member 141. In the embodiment shown, the adjustment member 151 contacts the second arm 147 at a tip 166, thereof, extending below the plane defined by a lower surface 167 of the indicator block 157.

To calibrate the load wheel 130, an operator aligns the load wheels 130, 130 in a conventional manner, and after alignment mounts the indicator block to the load wheel carriage 121, as by bolts 134. If the carriage 121 is not provided with suitable receivers for the bolts, holes may be drilled and tapped within the carriage 121 to receive the bolts. In this way, legs 161, 162 of indicator block 157 contact the rim 131 and fix the load cell 130 vertically. The fixture member 141 is fastened to the cover 132 by removing a pair of cover bolts 135, 135 and refastening bolts 135 or inserting longer fasteners 142, if necessary, after the receivers 145, 145 in fixture member 141 have been aligned with those in the cover plate 132.

With the adjustment assembly 140 installed, the indicator 155 is set to zero and a conicity test is performed on the machine 10. By running a tire T through the machine 10, a conicity reading is generated at the controller C. This reading may be zero, a positive, or a negative number. If the number is not zero, the sensing portion of load cell 130 must be rotated to correct the conicity reading. To do this, the operator may loosen the cell fasteners 134, 134, preferably without removing them, and similarly loosens the center fastener 137 on the cell 130. Then the sensing portion 133 of load cell 130 is rotated to correct the conicity reading causing it to be zero. In the present embodiment, rotation of load cell 130 is accomplished by turning adjustment member 151 causing it to move axially and exert a force on the lever arm created by the second arm 147 of fixture member 141. This force causes the fixture member 141 and cover 132 to rotate resulting in rotation of the sensing portion 133 for purposes of correcting the conicity reading.

In the embodiment shown, if the conicity reading is positive the load cell cover 132 would be rotated in the clockwise direction, and if negative, the cover 132 would be rotated in a counterclockwise direction. After adjusting the load cell 130 to the zero conicity position, the cell fasteners 134, 134 and center fastener 137 are tightened. A second conicity test is performed using the same steps noted above. If the resulting conicity reading remains zero then the calibration is complete. If the conicity reading is not zero, the calibration steps may be repeated, as before, until obtaining a zero value or a tolerated level of error.

When tires having raised lettering on the sidewalls are tested, it may be beneficial to perform the calibration, described above, for each side of the tire T. For example, the tire T would enter machine 10 be chucked, and a conicity test would be performed to obtain the conicity reading. After zeroing the tire T for one side, the same test and zeroing could be performed after removing the tire and flipping it over.

While a full and complete description of one embodiment of the present invention has been set forth in accordance with the dictates of the patent statutes, it should be understood that modifications can be resorted to without departing from the spirit hereof, and to appreciate the scope of the invention reference should be made to the following claims.

What is claimed is:

1. A calibration fixture for calibrating load cells in a tire uniformity machine, the tire uniformity machine having a carriage rotatably supporting a load wheel on a first spindle and a second spindle, a first load cell and second load cell in sensing relation to the load wheel and attached to the carriage, at least one of said load cells having a support portion and a sensing portion rotatable within said support portion, the calibration fixture comprising: a fixture member releasably attached to the sensing portion of the load cell; and an adjustment assembly supported by the tire uniformity machine operable with said fixture member to cause movement of the sensing portion relative to the support portion.

2. The calibration fixture of claim 1 further comprising an indicator in sensing relation with the adjustment member to track the movement thereof.

3. The calibration fixture of claim 2 further comprising an indicator block fastened to the carriage adjacent the load cell, wherein said indicator is fastened to said indicator block.

4. The calibration fixture of claim 3 wherein said indicator block has a body portion having first and second leg portions extending therefrom defining a recess for receiving a portion of the load cell.

5. The calibration fixture of claim 4 wherein said recess is generally V-shaped, wherein said first and second legs contact the load cell at an angle.

6. The calibration fixture of claim 5 wherein said legs tangentially contact the load cell.

7. The calibration fixture of claim 4 wherein said first and second legs have interior surfaces adjacent said recess, said interior surfaces extending at an angle from said body portion defining a truncated V-shaped recess.

8. The calibration fixture of claim 3 further comprising receivers formed on said indicator block, wherein said block is fastened to said carriage at said receivers.

9. The calibration fixture of claim 8 wherein said receivers are formed in said legs.

10. The calibration fixture of claim 8 wherein said receivers are a pair of slots.

11. The calibration fixture of claim 10 wherein said slots have a center, said centers being aligned along a horizontal line.

12. The calibration fixture of claim 1 wherein said fixture member includes a first arm and a second arm, said first arm being fastened to the cover of the load cell and said second arm extending outwardly from said first arm.

13. The calibration fixture of claim 12 wherein said adjustment assembly is operable with said second arm to cause rotation of said sensing portion.

14. The calibration fixture of claim 13, wherein said second arm has a tip extending beneath the carriage.

15. The calibration fixture of claim 14, wherein said adjustment assembly includes an adjustment member contacting said fixture member at said tip.

16. The calibration fixture of claim 1 further comprising an indicator block supported on the carriage adjacent the load cell, wherein said adjustment assembly is supported on said indicator block.

17. The calibration fixture of claim 1, wherein the cover of the load cell is attached to the load cell at at least one fastening point, and wherein said fixture member has at least one receiver corresponding to said fastening point, said fixture member being fastened to the cover at said receiver.

18. A method of calibrating a load cell used to measure forces on a load wheel in a tire uniformity machine for testing a tire having a carriage rotatably supporting the load cell on a spindle supported on the carriage, wherein the load cell has a rim surrounding a sensing portion of the load cell and a cover located within the rim and covering the sensing portion, the cover being fastened to the sensing portion by cover fasteners such that the sensing portion may be rotated by rotation of the cover, the load cell being secured to the carriage by cell fasteners located at the rim and a center fastener passing through the cover, the method comprising: providing a calibration fixture having a fixture member and an adjustment assembly operable with the fixture member to rotate the sensing portion of the load cell; aligning the load cell with the load wheel and fastening the load cell to the carriage; fastening said fixture member to the cover; zeroing the adjustment assembly; performing a conicity test on the tire noting the conicity reading of the tire uniformity machine; and when the conicity reading is not equal to zero, loosening the cell fasteners, actuating the adjustment assembly to zero the conicity reading and subsequently tightening the cell fasteners.

19. The method of claim 18 further comprising using at least one of the cover fasteners to fasten said fixture member to the cover.

20. The method of claim 18 further comprising after aligning the load cell vertically securing the load cell with an indicator block.

* * * * *